United States Patent
Flegel et al.

(10) Patent No.: US 8,941,269 B1
(45) Date of Patent: Jan. 27, 2015

(54) SYSTEM AND METHOD TO REDUCE ELECTRICAL TRANSIENTS

(75) Inventors: Jeffrey D. Flegel, Racine, WI (US); Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 304 days.

(21) Appl. No.: 13/280,718

(22) Filed: Oct. 25, 2011

Related U.S. Application Data (60) Provisional application No. 61/407,187, filed on Oct. 27, 2010.

(51) Int. Cl.
| | | |
|---|---|---|
| *H01H 47/00* | (2006.01) | |
| *H01H 35/00* | (2006.01) | |
| *H01H 83/18* | (2006.01) | |
| *H02H 3/02* | (2006.01) | |

(52) U.S. Cl.
USPC .......................... 307/115; 307/141.4; 307/126

(58) Field of Classification Search
USPC ....................... 307/115, 141.4, 126
See application file for complete search history.

(56) References Cited

U.S. PATENT DOCUMENTS

| 3,636,368 A * | 1/1972 | Sia .................................. 307/64 |
| 6,388,854 B1 * | 5/2002 | Berstis et al. .................... 361/94 |
| 7,030,514 B2 * | 4/2006 | Wareham et al. ............. 307/126 |
| 7,816,815 B2 * | 10/2010 | Siciliano et al. .............. 307/126 |
| 2008/0167756 A1 * | 7/2008 | Golden et al. ................. 700/297 |
| 2012/0074784 A1 * | 3/2012 | Snijder ........................... 307/52 |

* cited by examiner

*Primary Examiner* — Rexford Barnie
*Assistant Examiner* — Dru Parries
(74) *Attorney, Agent, or Firm* — Boyle Fredrickson, S.C.

(57) ABSTRACT

A power transfer device for connecting an electrical load to a power supply is disclosed. The power transfer device monitors the operating status of the power supply. Upon loss of power at the power supply, the power transfer device opens a switch between the power supply and the electrical load. When power is restored, the power transfer device executes a delay time module. After the delay time module has timed out, the power transfer device closes the switch to reconnect the power supply and the electrical load. Power transfer devices may be supplied to each of multiple loads connected to a power supply. By setting the time delay period of each power transfer device to a different duration, the electrical transients resulting from reconnecting all of the electrical loads to the power supply are reduced.

13 Claims, 9 Drawing Sheets

SYSTEM AND METHOD TO REDUCE ELECTRICAL TRANSIENTS

CROSS-REFERENCE TO RELATED APPLICATIONS

This application claims priority to U.S. provisional application Ser. No. 61/407,187, filed Oct. 27, 2010 and titled Power Transfer Optimizing Device, the entire contents of which is incorporated herein by reference.

BACKGROUND OF THE INVENTION

The present invention relates to a device for reducing electrical transients generated when power is restored from an electric power provider or otherwise supplied to multiple consumers on a power grid.

Homes, businesses, and other electric power users are typically connected to a network of power lines (i.e. a power grid) by an electrical connection. The electrical connection typically includes an electricity meter such that all electric current supplying power to that user flows through the electricity meter. The power grid itself includes sources of electric power, such as coal-fired generators or hydroelectric generators; electrically conductive lines, which usually carry high-voltage alternating current (AC) voltages; and the connections to the electric power users.

Many of the power lines are exposed to harsh environmental conditions and can become inoperable for many reasons, such as inclement weather, ice, falling trees, or animal damage, which may cause a portion of the power grid to fail or blackout. When a power grid comes back on after such an event, all of the loads, such as refrigerators, furnace fans, freezers, air conditioners, or motors, connected to the power grid want to come back on simultaneously. This sudden spike in demand creates a transient decrease (dip) in the voltage on the power lines, typically followed by a transient voltage spike. These transient spikes may cause damage to customer devices connected to the power grid, or to the power grid itself. For example, the wiring of the power lines may be damaged or destroyed; insulation may be damaged or stressed to fail at some later point; or electrical components such as capacitors, transformers, and transistors may fail.

In order to combat these and other transients, power line conditioners, such as surge suppressors, have been deployed. However, the surge suppressors are often supplied by the individual power consumers and only on some of the electrical equipment connected to the grid.

Therefore, what is needed is a device for reducing electrical transients generated on a power grid when power is restored from an electric power provider.

SUMMARY OF THE INVENTION

The subject matter disclosed herein relates to a device for reducing electrical transients generated when power is restored from an electric power provider or otherwise supplied to multiple consumers on a power grid. The present inventors have recognized that a significant source of problems occurs when simultaneously restoring or otherwise providing electric power to a large number of users such as at the end of a power loss or blackout. Therefore, the present invention contemplates a power transfer device that includes a delay element that postpones connecting a load, such as an individual power user, to the grid after power is restored. Varying the delay time period for different power users staggers the initial demand for power after power is restored, and staggering the initial demand for power after power restoration reduces the transient noise spikes, dips, and subsequent damage to the power grid and the devices connected to it.

According to a first embodiment of the invention, a power transfer device connects an electrical load to a power supply. The power transfer device includes an input terminal configured to be connected to the power supply and an output terminal configured to be connected to the electrical load. A switch selectively connects the input terminal to the output terminal, and a switching control unit is electrically connected to the input terminal to monitor the operating status of the power supply and is configured to generate a switching signal as a function of the operating status of the power supply. The switching signal closes the switch to connect the input terminal to the output terminal after a delay time period upon detection of power being provided by the power supply to the input terminals, and opens the switch to disconnect the input terminal from the output terminal upon detection of power not being provided by the power supply.

According to another aspect of the invention, the switching control unit may include a module to randomly generate the delay time period. The power transfer device may also include a memory device in communication with the switching control unit. The delay time period is preconfigured and stored in the memory device. The switching control unit may also include a communication port configured to receive the delay time period from a remote device connected to the communication port via a network.

According to yet another aspect of the invention, the switching control unit includes an electronic device electrically connected to the input terminal and configured to generate a signal corresponding to an operational status of the power supply. A delay element is configured to receive the signal corresponding to the operational status of the power supply as an input and to generate an output after the delay time period. The switching signal used to close the switch is generated as a function of the output of the delay element. The electronic device may be a time delay relay or a sensor. The power transfer device may also include a processor configured to receive the signal from the sensor and to execute a series of instructions to execute the delay element.

According to still another aspect of the invention, the switching control unit is configured to receive a command signal, and the switching control unit generates the switching signal to open the switch as a function of the command signal. The switching control unit may also include a communication port configured to receive the command signal from a remote device connected to the communication port via a network. Optionally, the switching control unit includes a logic circuit electrically connected to the input terminal and configured to decode the command signal from the power supply conducted via the input terminal.

According to another embodiment of the invention, a method of supplying power from a power supply to an electrical load monitors the operating status of the power supply and activates a delay module upon detection of power being present at the power supply. A switch is closed to establish an electrical connection between the power supply and the electrical load upon completion of the delay module. The method may randomly generate a delay time period prior to activating the delay module, and the delay module waits for the delay time period. Alternately, the delay time period may be received from a remote device prior to activating the delay module. The switch is opened to disconnect the power supply from the electrical load upon detection of power not being present at the power supply. The switch may also receive a command signal from a remote device and selectively connect the power supply to the electrical load as a function of the command signal.

According to still another embodiment of the invention, a system for connecting a plurality of electrical loads to a power supply includes a plurality of power transfer devices. Each of the power transfer devices is configured to connect one of the electrical loads to the power supply system. Each power transfer device includes an input terminal configured to be connected to the power supply and an output terminal configured to be connected to the electrical load. A switch selectively connects the input terminal to the output terminal, and a switching control unit is electrically connected to the input terminal to monitor the operating status of the power supply and is configured to generate a switching signal as a function of the operating status of the power supply. The switching signal closes the switch to connect the input terminal to the output terminal after a delay time period upon detection of power being provided by the power supply to the input terminals and opens the switch to disconnect the input terminal from the output terminal upon detection of power not being provided by the power supply. In the system, a first of the power transfer devices has a first delay time period and a second of the power transfer devices has a second delay time period, the second delay time period being different from the first delay time period.

Other aspects, features, and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof; and the invention includes all such modifications.

BRIEF DESCRIPTION OF THE DRAWINGS

An exemplary embodiment of the invention is illustrated in the accompanying drawings in which like reference numerals represent like parts throughout.

In the drawings.

In describing the exemplary embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Figure 1:
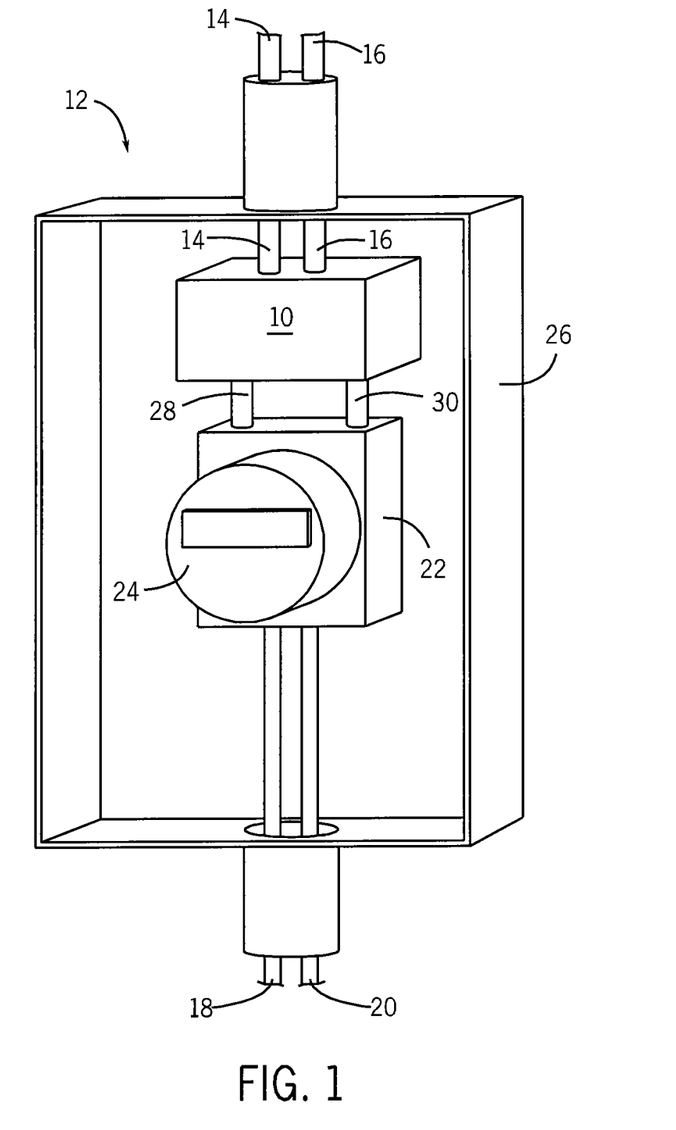
FIG. 1 is an isometric view of an electricity meter with the front panel removed showing one embodiment of the power transfer device of the current invention.

Referring now to the Figures, and initially to FIG. 1, this invention relates to a power transfer device 10 that controls the transfer of electric power between power input conductors 14, 16, which are connected to a power supply such as a utility power grid, and power output conductors 28, 30 which are connected to an electrical load such as the customer's power lines 18, 20.

In a representative embodiment, the power transfer device 10 may be contained within an electricity meter assembly 12. The electricity meter assembly 12 provides electrical connections for power input conductors 14, 16 from the power supply to the customer's power lines 18, 20. The customer's power lines 18, 20 are, in turn, connected to the customer's electrical distribution system, usually via a load center, such as an enclosure containing a series of circuit breakers or fuses (not shown).

The electricity meter assembly 12 not only provides a connection between the power supply and the customers' electrical equipment, but it also measures the electricity usage for billing purposes. Thus, the electricity meter assembly 12 may have an electronic metering assembly 22 and a display 24 contained in the housing 26. Electricity meter assemblies 12 provide an electrical path for almost all electrical consumption from the power grid. As such, they provide convenient and logical points for the controlled application of electric power when bringing a large number of customers on-line after a power interruption such as a blackout. Thus, the power transfer device 10 of the present invention may be contained within the electricity meter assembly 12. According to one embodiment of the invention, the power transfer device 10 may be wholly integrated into the electricity meter assembly 12 during manufacture, for example, as part of the electronics incorporated in electronic metering assembly 22. Optionally, the electricity meter assembly 12 may be modified after manufacture to contain the power transfer device 10.

In an alternative embodiment of the invention, the power transfer device 10 is not a part of or otherwise integrated into electricity meter assembly 12. Instead, the power transfer device 10 is connected in series between the power input conductors 14, 16 from the power grid and the electricity meter assembly 12. In yet another embodiment, the power transfer device 10 is again separate from electricity meter assembly 12 but is connected in series between the customer's power lines 18, 20 and the customer's electrical distribution system.

Figure 2:
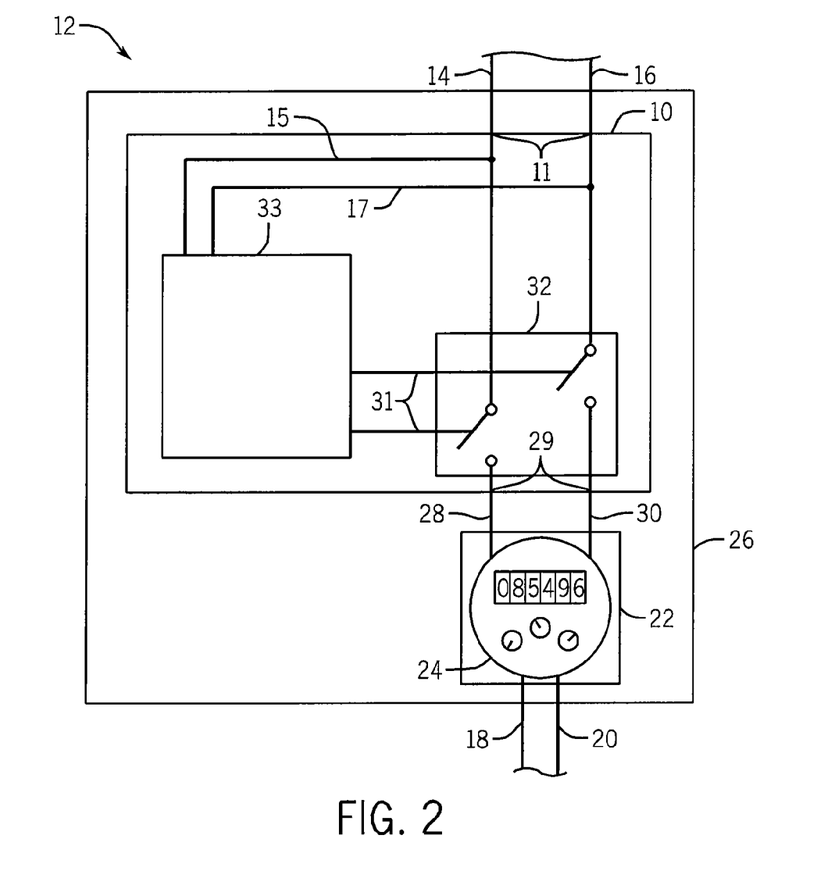
FIG. 2 is a block diagram of one embodiment of the power transfer device incorporated into an electricity meter assembly.

Referring now to FIG. 2, the power transfer device 10 includes an input terminal 11 configured to be connected to the power supply, for example, the power input conductors 14, 16. The power transfer device 10 also includes an output terminal 29 configured to be connected to the electrical load, for example, the power output conductors 28, 30 connected through the electronic metering assembly 22 to the customer's power lines 18, 20. It is contemplated that both the input terminal 11 and the output terminal 29 may have either a single electrical connection or multiple electrical connections according to the application requirements. Thus, the power transfer device 10 may be used to connect, for example, a supply conductor; a supply and a return conductor; or a supply, return, and neutral conductor of a single phase power supply, or any other configuration of power supply conductors to corresponding electrical load conductors.

The power transfer device 10 includes a switching unit 32 to selectively connect the input terminal 11 to the output terminal 29. The switching unit 32 may selectively connect some or all of the input conductors to the output conductors according to the system requirements. For example, the switching unit 32 may selectively connect a supply and a return conductor while a direct connection is made between a neutral conductor of the power supply and the electrical load. As illustrated, the switching unit 32 includes a pair of single-pole, single-throw switches. Optionally, the switching unit 32 may include, for example, a double-pole, single throw switch. In still other embodiments any suitable arrangement of switches may be used according to the electrical connections being established between the power supply and the electrical load.

Further, the switching unit 32 may include a latching switch. The latching switch may include, for example, a magnetic or a mechanical latching mechanism. The latching switch may require one signal to move the switch to a first state and a second signal to move the switch to a second state. Optionally, one signal may be used to toggle between states. The latching mechanism retains the present state of the switch after the signal is removed in order to minimize the power requirements of the switch. According to still another option, the switching unit 32 may include a normally open switch that is energized to close the switch and to connect the input terminal 11 to the output terminal 29.

Figure 3:
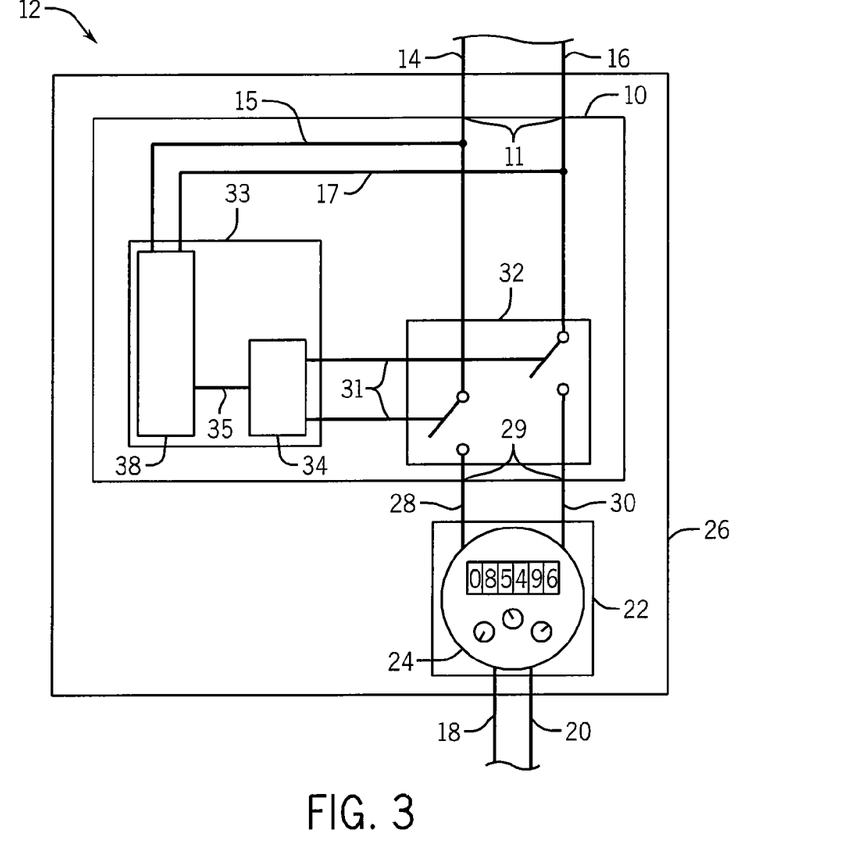
FIG. 3 is a block diagram of another embodiment of the power transfer device incorporated into an electricity meter assembly.
Figure 4:
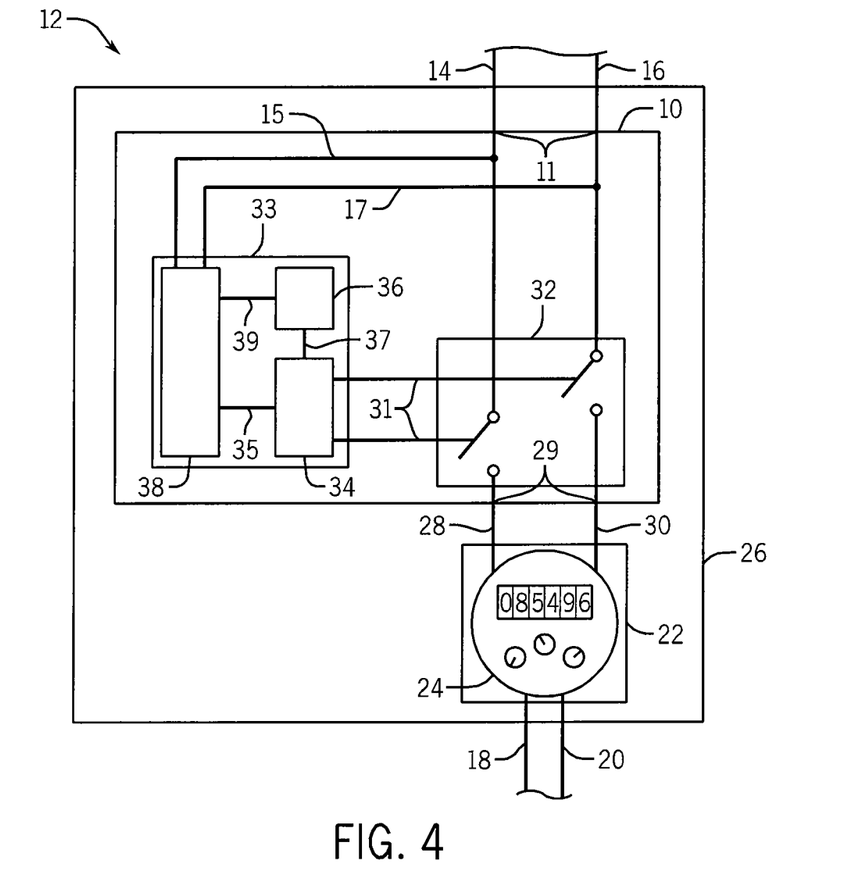
FIG. 4 is a block diagram of another embodiment of the power transfer device incorporated into an electricity meter assembly.

The switching unit 32 receives switching signals 31 from a switching control unit 33. Referring also to FIGS. 3 and 4, the switching control unit 33 may include a controller 34, a delay module 36, and a power supply 38. It is contemplated that one or more of the controller 34, delay module 36, and power supply 38 may be implemented as separate components or combined in whole or in part and integrated, for example, on a field programmable gate array (FPGA), application specific integrated circuit (ASIC), or other suitable processor or logic circuit. Suitable connections, 35, 37, and 39, are made between the power supply 38 and the controller 34; the delay module 36 and the controller 34; and the power supply 38 and the delay module 36, respectively. It is contemplated that each of the connections, 35, 37, and 39, may be one or more conductors carrying power or control signals between each module according to system requirements.

A first and a second monitoring conductor, 15 and 17 respectively, are connected to the input terminal 11 to provide the voltage and/or current waveforms from the power supply to the switching control unit 33. The monitoring conductors, 15 and 17, may be connected to the power supply 38, which, in turn, converts the input voltage, typically 110 VAC, to a suitable control voltage, such as 5 VDC, for use by the switching control unit 33. The power supply 38 may also include one or more energy storage components, such as a battery or capacitor, such that the switching control unit 33 may remain active for a time period, determined by the capacity of the energy storage component, of sufficient length to open the contacts in the switching unit 32 upon losing power from the power supply.

Figure 6:
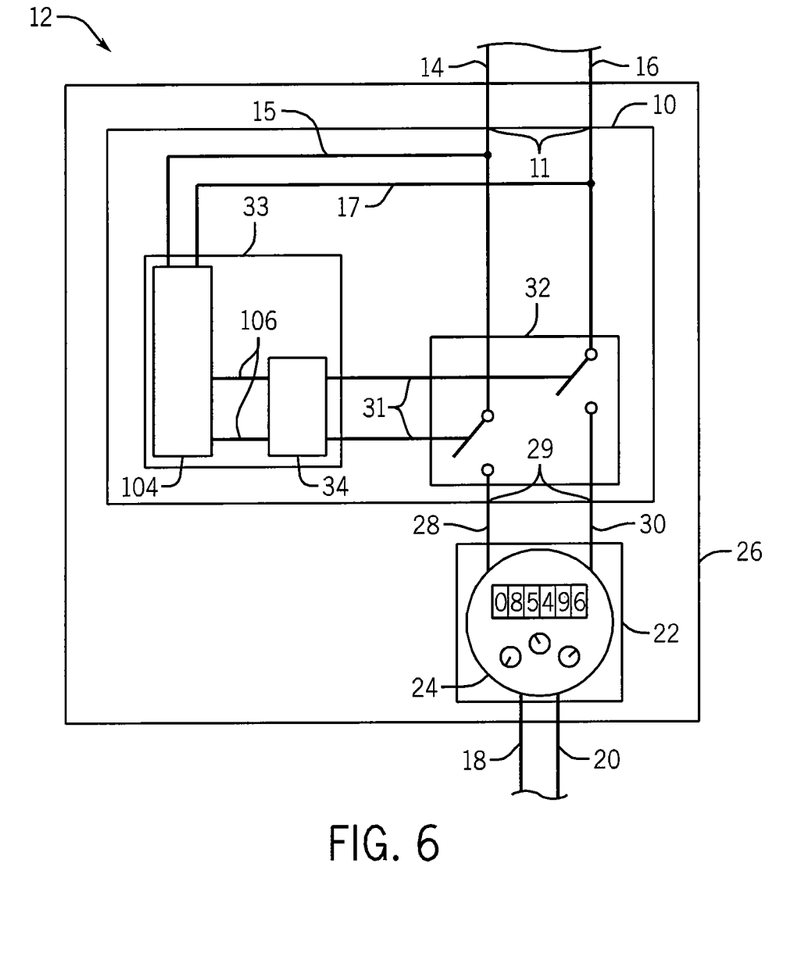
FIG. 6 is a block diagram of another embodiment of the power transfer device incorporated into an electricity meter assembly.
Figure 7:
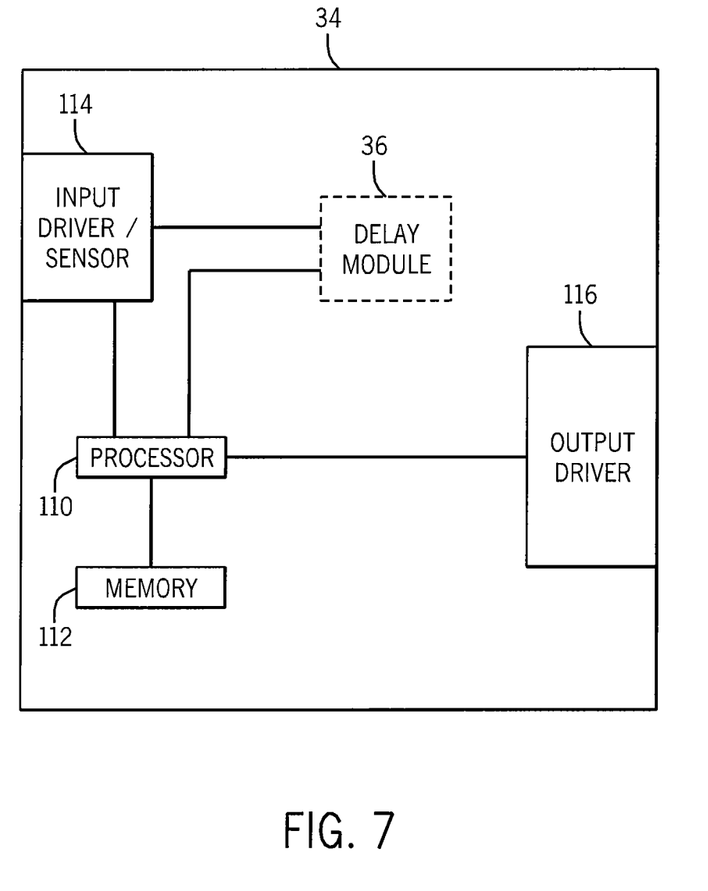
FIG. 7 is a block diagram of one embodiment of the switching control unit of FIG. 3.

The voltage and/or current waveforms from the power supply are subsequently conducted to the controller 34. The controller 34 may be have a direct electrical connection to the input terminal 11 or a sensing circuit may be included in the power supply 38 to convert the voltage and/or current waveforms into an analog or digital signal suitable for input to, for example, a processor 110. Referring also to FIG. 7, in one embodiment, the controller 34 includes an input driver 114 to receive signals. The input driver 114 may also include a sensing circuit if conversion of the voltage and/or current waveforms is required. The controller 34 includes a processor 110 in communication with a memory device 112. The processor 110 is configured to execute a series of instructions stored on the memory device 112 to generate the switching signals 31 used to control the switches in the switching unit 32. Optionally, the processor 110 may be a logic circuit (not shown) configured to receive analog signals and similarly generate the switching signal 31, accordingly. An output driver 116 delivers the switching signal 31 to the switching unit 32. Optionally, the delay module 36 may be incorporated into the instructions executing on the processor 110 or the logic circuit. Alternately, the delay module 36 may be a separate device, as shown in FIG. 4. According to yet another embodiment, as shown in FIG. 6, the monitoring conductors, 15 and 17, may be connected to a time-delay relay 104. The time-delay relay 104 functions as the delay module 36 and conducts the voltage and current waveforms to the controller 34 via conductors 106 after a configurable delay time period.

Figure 5:
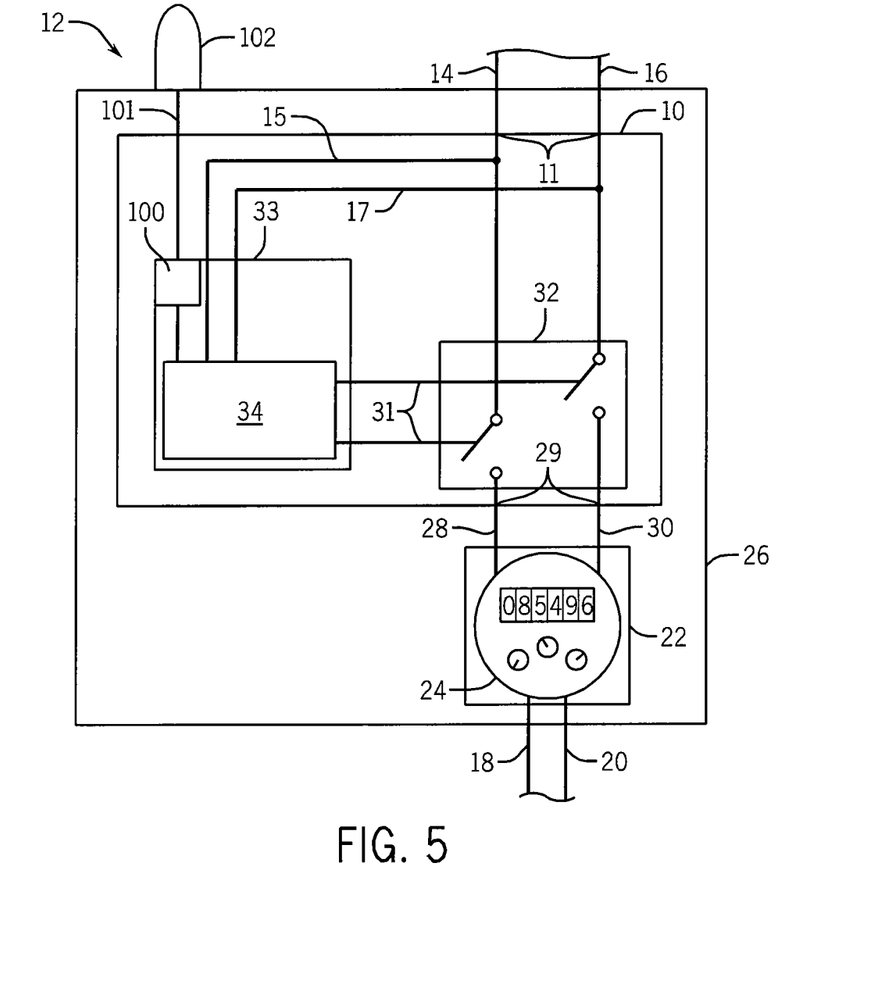
FIG. 5 is a block diagram of another embodiment of the power transfer device incorporated into an electricity meter assembly.

The switching control unit 33 may further be configured to receive a signal from a remote device. The utility power provider, for example, may generate a signal commanding the switching unit 32 to open or close. According to one embodiment, the utility power provider provides a wired connection to distributed locations proximate to individual users with wireless connections from those locations to the individual power transfer devices 10. The switching control unit 33 includes a communication port 100 connected via conductor 101 to an antenna 102, which may be mounted to the power transfer device 10 or to the housing 26 of the electricity meter assembly 12. Optionally, the utility power provider may provide a modulated command signal via the power input conductors 14, 16 according to techniques known in the art. The switching control unit 33 receives signals corresponding to the voltage and/or current waveforms on the power input conductors, 14 and 16, via the monitoring conductors, 15 and 17, and demodulates the command signal. According to yet another embodiment, the power supply may be a generator which provides a discrete command signal to the switching control unit 33.

Figure 8:
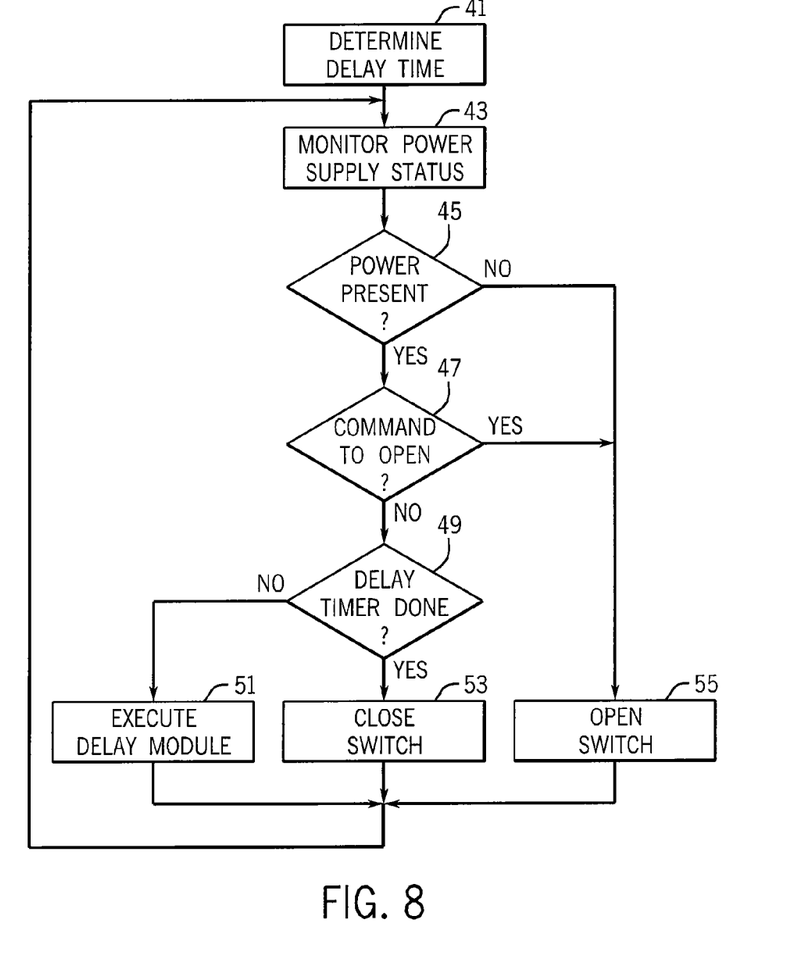
FIG. 8 is a flow chart showing the operation of the power transfer device.

In operation, the power transfer device 10 operates to connect an electrical load to the power supply according to a time delay period. Referring also to FIG. 8, at step 41, the switching control unit 33 determines the desired delay time period. The desired delay time period may be a fixed value stored in the memory device 112. Optionally, a module may execute, for example, on the processor 110 to randomly determine a delay time period. According to another embodiment of the invention, the delay time period may be communicated to the switching control unit 33 from a remote device and received, for example, in a wireless communication via the antenna 102 and communication port 100. At step 43, the status of the power supply is monitored to determine if power is present at the power supply. If power is not present upon an initial connection to the power supply or when power returns after a power outage, the switching control unit 33 generates the switching signal to open the switches in the switching unit 32, according to steps 45 and 55. If power is present, the switching control unit 33 may monitor whether it has received a command from another device to open the switches in the switching unit 32. If a command to open the switching device is present, the switching control unit 33 generates the switching signal to open the switches in the switching unit 32, according to steps 47 and 55. If power is present at the power supply and there is no command to open the switch, the switching control unit 33 executes a delayed close of the switch according to steps 45-53. At step 49, the switching control unit 33 determines whether the delay module 36 has executed the delay for the desired delay time period. If not, the delay module 36 continues execution and the switch remains open. When the delay module 36 has timed out, the switching control unit 33 generates the switching signal 31 to close the switches in the switching unit 32.

Figure 9:
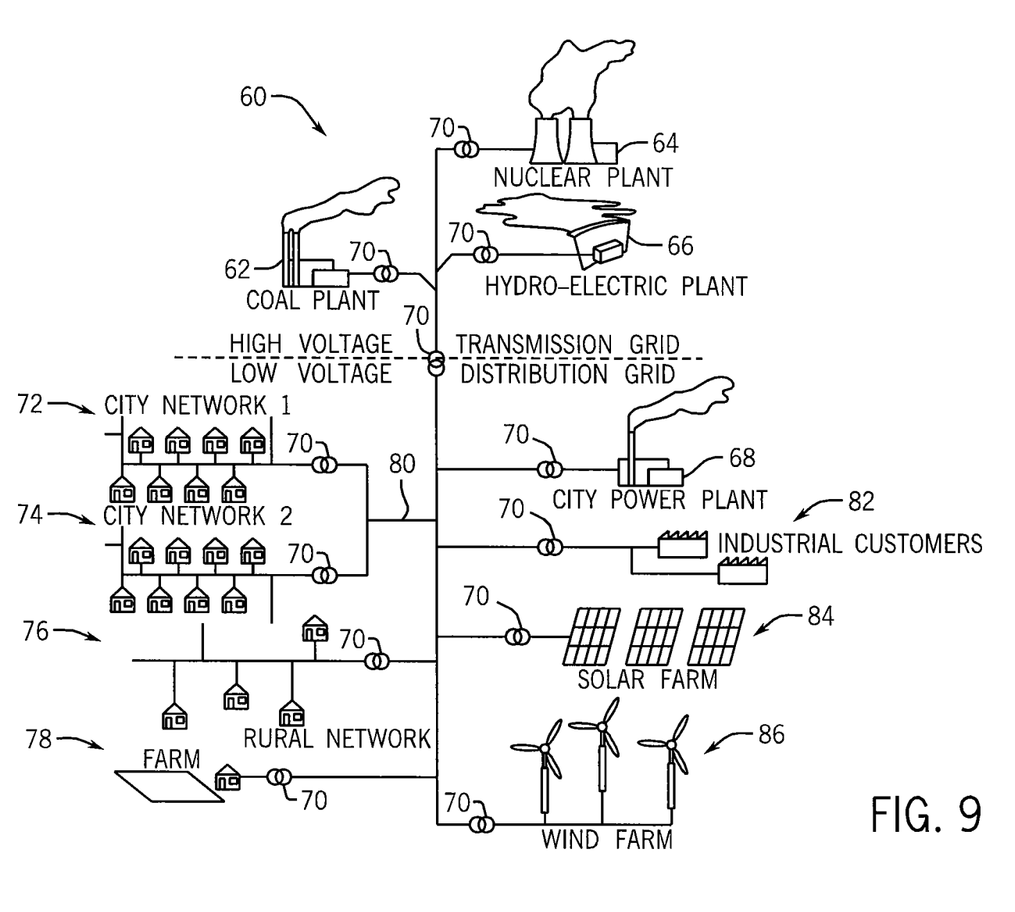
FIG. 9 is a diagram of an exemplary electric power grid showing power distribution networks.

Referring now to FIG. 9, an exemplary electric power grid failure and subsequent restoration of power is described. The power grid 60 may incorporate power generators such as a coal plant 62, a nuclear plant 64, a hydroelectric plant 66, and/or a city power plant 68. A number of substations 70 isolate portions of the grid and provide differing voltages for respective portions of the grid such as a first city network 72, a second city network 74, a rural network 76, and a farm network 78. If, for example, a power line 80 between the power generators and the city networks, 72 and 74, failed, then both city networks, 72 and 74, would be de-energized.

Typically, when power is restored after repairing the failed power line 80, the re-energizing of both city networks is staggered. For example, the first city network 72 is energized and, after a delay, the second city network 74 is energized. However, with the power transfer devices 10 of the current invention, there is no need to stagger re-energization of the two networks, 72 and 74. Each of the houses in the first and second city networks, 72 and 74 respectively, may be equipped with a power transfer device 10. By configuring the power transfer devices 10 with a variety of delay time periods, each of the houses is reconnected to the utility grid at a different time. As previously indicated, the delay times may be randomly selected from a range of times or a preselected time may be stored in each of the power transfer devices 10. Optionally, one of the power generating facilities may communicate with the power transfer devices 10 to establish varying delay times. Coordinating buildings in a network to have different delay time periods permits re-energizing each network, 72 or 74, over some time period, such as a 10 sec to 5 minute range. Thus, conditions that create the unwanted transient spikes can be avoided.

When utility power is restored after a power outage, the different delay time periods in each power transfer device 10 function to prevent the simultaneous restoration of power to all of the consumers. It is contemplated that the delay time period may be randomly generated by a module executing in the switching control unit 33. The delay time period may, therefore, be randomly selected from a range of, for example, 10 seconds to 5 minutes. Optionally, a portion of the power transfer devices 10 may randomly select from a first portion of the total range of delay times and a second portion of the power transfer devices 10 may randomly select from a second portion of the total range of delay times. A fixed increment, such as 1 or 5 second intervals, may be established. Optionally, a fixed time delay period may be preselected and stored in a memory device 112 of each of the power transfer devices 10. Different power transfer devices 10 may be preset for a variety of delays. For example, a part number, indicating a specific preset delay, may be assigned to each power transfer device 10. A finite range of part numbers may be defined, such as 50 different part numbers corresponding to 50 different delays. A system according to this embodiment may either randomly install power transfer devices 10 having varying part numbers or different portions of the grid may be assigned a part number such that power transfer devices 10 with given delays are installed in designated areas to stagger power restoration. As still another option, a time delay period can be communicated from a remote source in communication with the power transfer device 10.

The power transfer device 10 of the present invention also provides other advantages. For example, the power transfer device 10 can be remotely controlled, which allows the switches of the switching unit 32 to be closed or opened from a remote or central location. A command signal may be communicated from the remote location to each power transfer device 10 and the switching control unit may generate a switching signal 31 in response to the command signal, remotely controlling the power transfer device 10. This capability enables a utility or other power provider to control the supply of power to individual customers or loads. This capability is useful, for example, in the control and activation of rolling blackouts—block by block, house by house, etc. This control also enables a utility to allow users to sign up to be cut off at periods of time for a discount on a utility bill, and also allows a utility or power provider to cut off power in certain circumstances, e.g. when a utility bill has not been paid. This remote control reduces labor costs and time, and allows controlled and opt-in compliance for rolling blackouts.

It is understood that, while the invention has been shown with a pair of single-pole single-throw switches, any other satisfactory switching device may be used. The switch itself may be an electro-mechanical relay, field effect transistor (FET, including MOSFET, JFET, including n-channel and p-channel variations for all), bipolar junction transistor (BJT including NPN and PNP variations), or any other satisfactory switching mechanism.

Although the best mode of carrying out the present invention is disclosed above, practice of the present invention is not limited thereto. It is further contemplated that various additions, modifications and rearrangements of the features of the present invention may be made without deviating from the spirit and scope of the invention as set forth in the following claims.

The invention claimed is:

1. A system for supplying power from a utility grid, comprising:
   a plurality of utility power consumers, wherein each utility power consumer includes a building having a power input interconnected with the utility grid;
   a first power transfer device connected between the utility grid and the power input of a first one of the buildings, including:
      a first input terminal configured to be connected to the utility grid;
      a first output terminal configured to be connected to at least one electrical load of the first building;
      a first switch selectively connecting the first input terminal to the first output terminal; and
      a first switching control unit electrically connected to the first input terminal to monitor the operating status of the utility grid and configured to generate a first switching signal as a function of the operating status of the utility grid, wherein:
      the first switching control unit detects power being provided by the utility grid to the first input terminal after a power outage, executes a first delay module having a first randomly selected delay time period, and generates the first switching signal to close the first switch to connect the first input terminal to the first output terminal after the first delay module executes; and wherein the first switching signal opens the first switch to disconnect the first input terminal from the first output terminal upon detection of power not being provided by the utility grid; and a second power transfer device connected between the utility grid and the power input of a second one of the buildings, including:
  a second input terminal configured to be connected to the utility grid;
  a second output terminal configured to be connected to at least one electrical load of the second building;
  a second switch selectively connecting the second input terminal to the second output terminal; and
  a second switching control unit electrically connected to the second input terminal to monitor the operating status of the utility grid and configured to generate a second switching signal as a function of the operating status of the utility grid, wherein:
    the second switching control unit detects power being provided by the utility grid to the second input terminal after a power outage, executes a second delay module having a second randomly selected delay time period, and generates the second switching signal to close the second switch to connect the second input terminal to the second output terminal after the second delay module executes;
  wherein the second switching signal opens the second switch to disconnect the second input terminal from the second output terminal upon detection of power not being provided by the utility grid; and
  wherein the first and second delay time periods are executed by the first and second delay modules of the first and second power transfer devices, respectively, independent of control from the utility grid, and wherein the second delay time period is different from the first delay time period.

2. The system of claim 1 wherein the first and the second switching control units each includes a module to randomly generate the first and the second delay time periods, respectively.

3. The system of claim 1 wherein the first and the second switching control units each includes:
  an electronic device electrically connected to the first and second input terminals, respectively, and configured to generate a signal corresponding to an operational status of the utility grid; and
  a delay element configured to receive the signal corresponding to the operational status of the utility grid as an input and to generate an output after the first and second delay time periods, respectively, wherein the first and second switching signals that close the first and second switches, respectively, are generated as a function of the output of the delay element.

4. The system of claim 3 wherein the electronic device is a time delay relay.

5. The system of claim 3 wherein the electronic device is a sensor and the first and the second power transfer devices each further comprises a processor configured to receive the signal from the sensor and to execute a series of instructions to execute the time delay.

6. A method of supplying power from a utility grid to a plurality of utility power consumers, each of which includes a building having a power input interconnected with the utility grid, comprising the steps of:

the plurality of consumers each monitoring the operating status of the utility grid;
at each of the plurality of utility power consumers, opening a switch to disconnect the utility grid from the utility power consumer upon detection of power not being present at the utility grid during a power outage;
at each of the plurality of utility power consumers, activating a delay module upon detection of power being present at the utility grid after the power outage, wherein the delay modules at the plurality of utility power consumers execute for delay time periods each having a different randomly selected duration independent of control from the utility grid; and
at each of the plurality of utility power consumers, subsequently establishing an electrical connection between the utility grid and the utility power consumer upon completion of the delay module.

7. The method of claim 6 further comprising the step of randomly generating the delay time period for each switch prior to activating the delay module.

8. A system for connecting a plurality of utility power consumers to a utility grid, the system comprising:
  a plurality of power transfer devices, wherein each of the power transfer devices is configured to connect one of the utility power consumers to the utility grid, each power transfer device including:
    an input terminal configured to be connected to the utility grid,
    an output terminal configured to be connected to at least one electrical load of the utility power consumer,
    a switch selectively connecting the input terminal to the output terminal,
    a switching control unit electrically connected to the input terminal to monitor the operating status of the utility grid, wherein the switching control unit is configured to generate a switching signal as a function of the operating status of the utility grid, wherein the switching signal opens the switch to disconnect the input terminal from the output terminal upon detection of power not being provided by the utility grid: and
    wherein after an outage of utility power the switching control unit detects power being provided by the utility grid to the input terminal, executes a delay module having a randomly selected delay time period, and generates the switching signal to close the switch to connect the input terminal to the output terminal after the delay module executes;
  wherein the delay time period is different for each delay module of the plurality of power transfer devices and is independent of control from the utility.

9. The system of claim 8 wherein each power transfer device further includes a module to randomly generate the delay time period.

10. The system of claim 8 wherein each power transfer device further includes a memory device wherein the delay time period is preconfigured and stored in the memory device.

11. The system of claim 8 wherein each of the delay time periods is less than five minutes.

12. The system of claim 1 wherein each of the first and the second delay time period is less than five minutes.

13. The method of claim 6 wherein each of the delay time periods is less than five minutes.

* * * * *